(12) United States Patent
Duffy et al.

(10) Patent No.: US 6,827,551 B1
(45) Date of Patent: Dec. 7, 2004

(54) SELF-TUNING IMPACT DAMPER FOR ROTATING BLADES

(75) Inventors: Kirsten P. Duffy, University Heights, OH (US); Gerald V. Brown, Lakewood, OH (US); Ronald L. Bagley, Boerne, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/498,794

(22) Filed: Feb. 1, 2000

(51) Int. Cl.[7] ............................................. F03B 11/04
(52) U.S. Cl. ..................... 415/119; 416/145; 416/500
(58) Field of Search .................... 415/119; 416/500, 416/145

(56) References Cited

U.S. PATENT DOCUMENTS

| 2,659,243 A | * | 11/1953 | Darrieus .................. 74/573 R |
|---|---|---|---|
| 4,182,598 A | | 1/1980 | Nelson |
| 4,360,088 A | | 11/1982 | Amble |
| 4,441,859 A | | 4/1984 | Sadler |
| 4,484,859 A | | 11/1984 | Pask |
| 4,650,167 A | | 3/1987 | Steiner |
| 5,052,890 A | | 10/1991 | Roberts |
| 5,232,344 A | | 8/1993 | El-Aini |
| 5,346,362 A | | 9/1994 | Bonner |
| 5,369,882 A | | 12/1994 | Dietz |
| 5,498,137 A | | 3/1996 | El-Aini |
| 5,749,705 A | | 5/1998 | Clarke |
| 5,820,348 A | | 10/1998 | Fricke |
| 5,924,845 A | | 7/1999 | Bagley |

OTHER PUBLICATIONS

"A Centrifugal Pendulum Absorber for Rotating Hollow Engine Blades"; Hollkamp, Bagley & Gordon, Journal of Sound and Vibration, v. 219, n.3 pp 539–548;(1999).
"Impact Damping of Rotating Cantilevu Plates", Duffy, Brown, Mehmed; Proceedings of 3rd National Turbine Engine High Cycle Fatigue Conference, Feb. 2–5, 1998.
"A Self–Tuning Impact Damper for Rotating Blades" Duffy, Bagley, Mehmed; Proceedings of the 4th National Turbine Engine High Cycle Fatigue Conference Feb. 9–11, 1999.

* cited by examiner

Primary Examiner—Edward K. Look
Assistant Examiner—Dwayne White
(74) Attorney, Agent, or Firm—Kent N. Stone (57) ABSTRACT

A self-tuning impact damper is disclosed that absorbs and dissipates vibration energy in the blades of rotors in compressors and/or turbines thereby dramatically extending their service life and operational readiness. The self-tuning impact damper uses the rotor speed to tune the resonant frequency of a rattling mass to an engine order excitation frequency. The rattling mass dissipates energy through collisions between the rattling mass and the walls of a cavity of the self-tuning impact damper, as well as through friction between the rattling mass and the base of the cavity. In one embodiment, the self-tuning impact damper has a ball-in-trough configuration with tire ball serving as the rattling mass.

2 Claims, 12 Drawing Sheets

SELF-TUNING IMPACT DAMPER FOR ROTATING BLADES

ORIGIN OF THE INVENTION

The invention described herein was made in the performance of work under a NASA contract and subjected to the provisions of §305 of the National Aeronautics and Space Act of 1958, Public Law 85–568(72Stat. 435;42 U.S.C. 2457).

FIELD OF THE INVENTION

The present invention relates to blades form turbomachinery and, more particularly, to an improved mechanism for dampening vibrations experienced by the blades or disks of turbomachinery so as to extend their operational lives and improve machine performance.

BACKGROUND OF THE INVENTION

Turbomachinery is used in many applications to perform work on or extract work from both gaseous and liquid fluids. Examples of such machinery include gas turbines, axial and centrifugal fans, marine and aviation propellers, fan blades, helicopter blades, tail rotors, wind turbines, turbo pumps, and steam and hydraulic power turbines. This machinery may contain one or more broad class of rotating and fixed appendages including blades, vanes, foils, and impellers depending on the need of a particular machine.

Turbines and compressor sections within an axial flow turbine engine, as well as other turbomachinery, generally include a rotator assembly comprising a rotating disk and a plurality of rotor blades circumferentially disposed around the disk. During operation, turbine engine rotator assemblies rotate at a variety of speeds through fluid that varies in temperature, pressure, and density. As a result, the blades may be excited in a number of different modes of vibration. Lower order modes manifest themselves in bending modes and torsion modes, whereas higher order modes have more complex blade deformations.

The rotating blades are subjected to resonating conditions as more fully described in U.S. Pat. No. 5,924,845 ('845) which is herein incorporated by reference. As described in the '845 patent, potentially destructive resonant vibration can occur when the frequency of an alternating excitation force imposed on a blade is near a natural, or resonant, frequency of the blade. At these resonant frequencies a blade will experience peak vibrations. A typical blade will have more than one resonant frequency, representing the various modes, or ways, in which the blade can vibrate. For example, a jet engine blade may be viewed as a simple cantilever beam. If an alternating excitation force is imposed on the blade at a resonant frequency corresponding to the first mode, it will simply bend back and forth with one wave along its length. If the excitation frequency is at the second mode resonant frequency, the blade will bend with two waves along its length, and so forth. Modern jet engine blades are more like plates than beams, so that the blades have more complicated vibration modes, including, in addition to conventional bending modes, torsion modes and chordwise bending modes. All of these vibration modes combine to determine the actual resonant frequencies for a turbomachine blade.

Excitation forces in turbomachines arise from time dependent fluid flows. For example, one usual source of an excitation force is the aerodynamic force imposed on a rotor blade each time it rotates past a stator vane (a stationary blade). There will be a number of stator vanes past which the rotor blade will travel during one rotor revolution, causing the frequency of aerodynamic excitation to be equal to the number of stator vanes multiplied by the rotor speed. This is called engine order excitation. Since there are generally several rows of stator vanes and rotor blades of varying numbers, there are typically many engine order excitation frequencies that a rotor blade will experience. Each of these physical sources of vibratory excitation will cause a different so-called speed line, which is an integer multiple of engine rotor speed.

As first described by W. Campbell in a pioneering 1924 work describing the problems of vibration in turbomachinery, this can be described in a Campbell diagram, where speed lines are plotted on a graph as functions of the rotor speed. Also plotted on the Campbell diagram are the various frequencies at which resonant vibration will occur for each mode of the rotor blade in question. Wherever a speed line, corresponding to a regularly occurring vibratory excitation in a turbomachine, crosses a resonant blade frequency line, resonant blade vibration is possible. This speed line can cross several blade resonant frequencies as the turbomachine speeds up. This means that the excitation frequency on blades will coincide with successively higher resonant frequencies of the blades as rotor speed increases.

Adding one or more dampening devices to a rotor blade will decrease the vibrations and lessen the damage to the blade. In addition, it may allow the turbomachine to be run at a higher speed, improving the efficiency of the machine. Dampening devices may also be added to the rotor disk, which may have vibration modes coupled to the rotor blades. The dampers can then reduce vibrations in the rotor disk and/or the rotor blade.

Rotor blades that are used in axial flow turbines and compressors can be excited to severe levels of vibration when subjected to time-dependent forces as described above. The severe vibrations can damage the material in rotor blades. Devices that absorb and dissipate vibration energy in the blades of rotors in compressors and/or turbines, such as the centrifugal pendulum absorber disclosed in the '845 patent, are known and more of which are disclosed in U.S. Pat. Nos. 4,182,599; 4,360,088; 4,441,859; 4,484,859; 4,650,167; 5,052,890; 5,232,344; 5,346,362; 5,369,882; 5,498,137; 5,749,705; and 5,820,348 all of which are herein incorporated by reference. It is desired that further improvements for a vibration dampening mechanism for blades be provided

OBJECTS OF THE INVENTION

It is the primary object of the present invention to provide for a dampening mechanism that absorbs and dissipates vibration energy in the blades or disks of compressors and/or turbines so to extend the service life thereof.

It is another object of the present invention to provide for a dampening mechanism that uses the technique of self-tuned impact dampening.

It is another object of the present invention to provide for a self-tuned impact dampening mechanism that is adjustable to dampen engine-order resonant vibrations along a speed line.

It is a further object of the present invention to provide for a self-tuning dampening mechanism that utilizes a ball-in-spherical trough configuration.

It is a still further object of the present invention to provide for a self-tuning dampening mechanism that can be located internal or external to the blade for which it provides the dampening features so as to extend its operational life.

SUMMARY OF THE INVENTION

This invention is directed to a self-tuning dampening mechanism for a rotating appendage for a turbomachine which absorbs and dissipates the vibration energy in the appendage so as to extend its operational life.

The vibration damper device comprises a member coupled to a rotor having a frequency of vibration with the member being subjected to fluid-flow forces when the rotor is rotated. The member has one or more cavities with walls which confine a rattling mass in each cavity having parameters that are selected in accordance with the anticipated frequency of aerodynamic excitation associated with a speed line on the appropriate Campbell diagram.

In one embodiment, the vibration damper device has a trough configuration having a spherical bottom and a rattling mass, such as a bail, having a resonant frequency that corresponds to the anticipated frequency of aerodynamic excitation.

BRIEF DESCRIPTION OF THE DRAWINGS

For a better understanding of the nature and objects of the present invention, reference should be made to the following detailed description taken in conjunction with the accompanied drawings, in which like parts are given like reference numbers, and wherein:

FIG. 2 is composed of FIGS. 2(A), 2(B), and 2(C), wherein FIGS. 2(A), and 2(B) schematically illustrate prior art dampening mechanisms, and FIG. 2(C) schematically illustrates the self-tuning impact damper mechanism of the present invention;

FIG. 6 is composed of FIGS. 6(A) and 6(B) that respectively illustrate the amplification factor calculation curves and damping factor calculation curves associated with the self-tuning impact damper of the present invention;

FIG. 9 is composed of FIGS. 9(A) and 9(B) that illustrate various views of the ball-in-spherical trough configuration of the present invention;

DETAILED DESCRIPTION OF THE PREFERRED EMBODIMENTS

Figure 1:
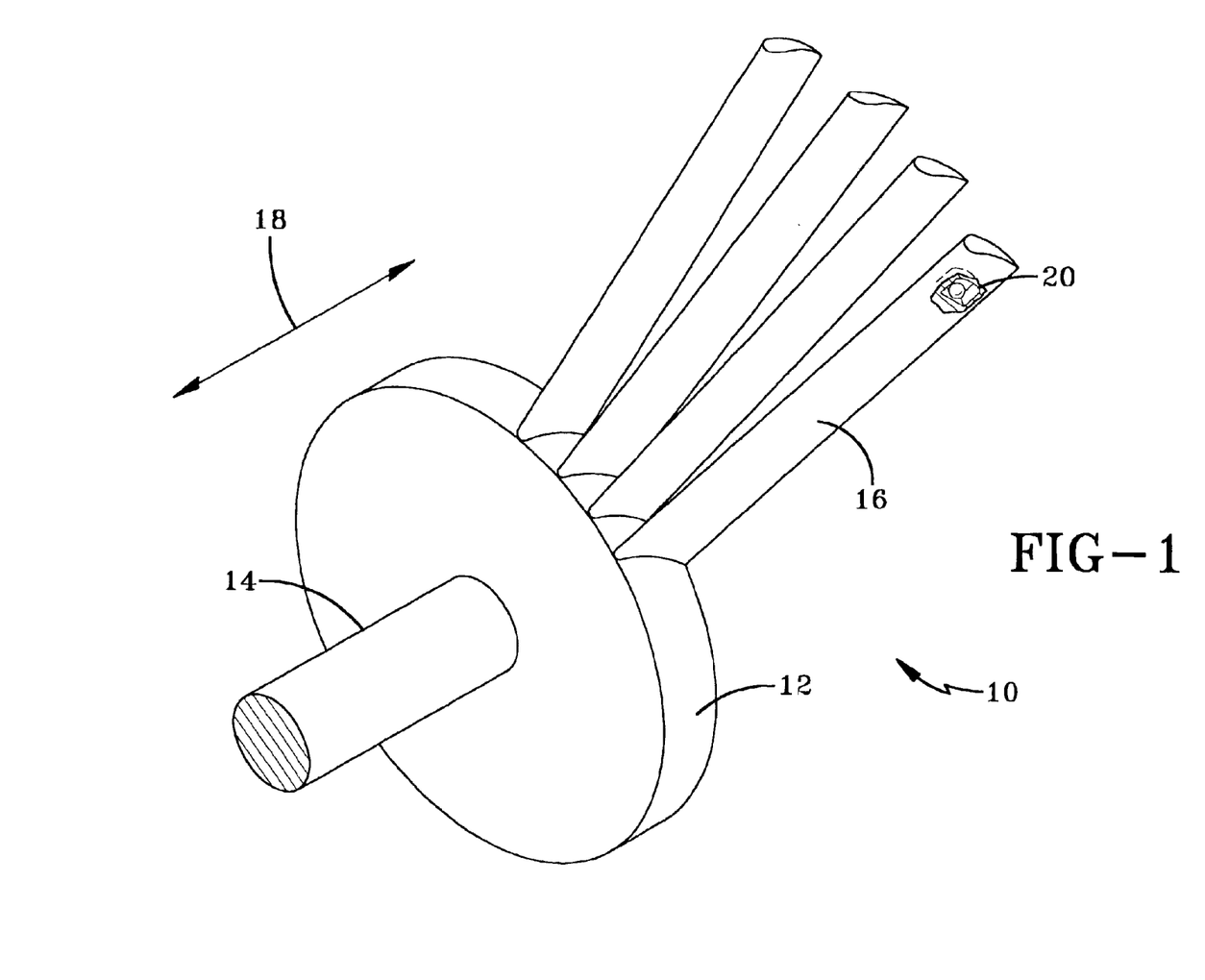
FIG. 1 is a schematic drawing of a turbine wheel with blades and a shaft.

Referring to the drawings, wherein FIG. 1 illustrates a turbomachine 10 having a rotor hub 12 that is driven by a shaft 14 at a known speed. The rotor hub 12 has blades 16 that are circumferentially distributed about the rotor hub 12 for rotation therewith. A fluid such as air or water is moving, relative to the turbomachine 10, such as along axis 18, in either direction parallel to the shaft 14. Alternatively, the fluid flow can be in any desired direction or can be non-laminar or highly turbulent.

Each or any of the blades 16, and if desired the hub 12, houses a self-tuned impact damper mechanism 20 of the present invention that absorbs and dissipates vibration energy in the blades 16 of the rotor or in the hub 12 of the turbomachine. This absorption and dissipation dramatically extend the service life of the blade 16, or if desired, that of the hub 12.

In general, the self-tuning impact damper 20 of the present invention uses the rotor speed to tune the resonant frequency of a rattling mass, to be described, to the frequency of vibration excitation in a rotor, thereby, enabling the rattling mass to absorb kinetic energy from the blade 16, or if desired, from the hub 12. The rattling mass then dissipates the absorbed energy through collisions between the rattling mass and the walls of the cavity and through friction between the rattling mass and the trough of the self-tuning impact damper 20 within the blade that encloses the rattling mass. The self-tuning impact damper may be located internal or external to the blade 16 or to the hub 12. The benefits of the self-tuning impact mechanism 20 of the present invention may be better appreciated by first discussing prior art damping mechanisms shown in FIG. 2 which is composed of FIGS. 2(A), 2(B), and 2(C).

Figure 2A:
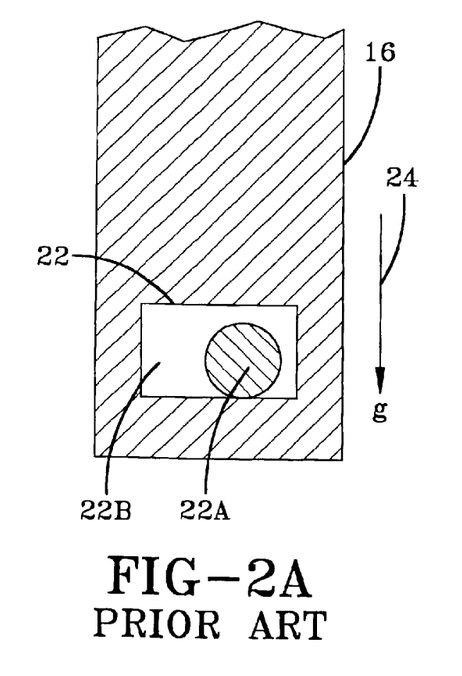
Figure 2B:
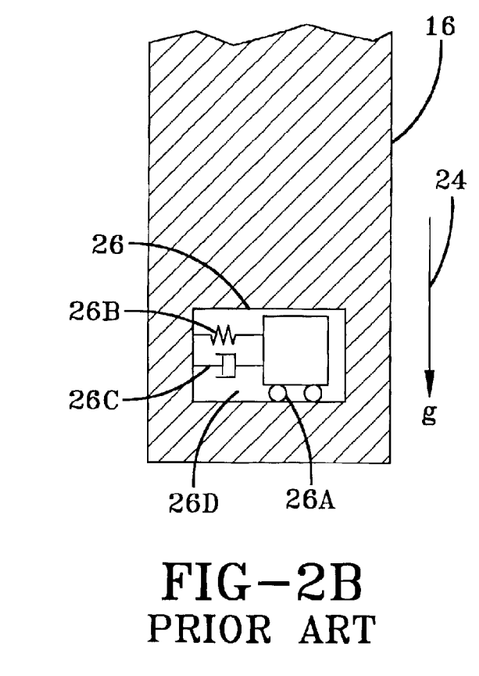
Figure 2C:
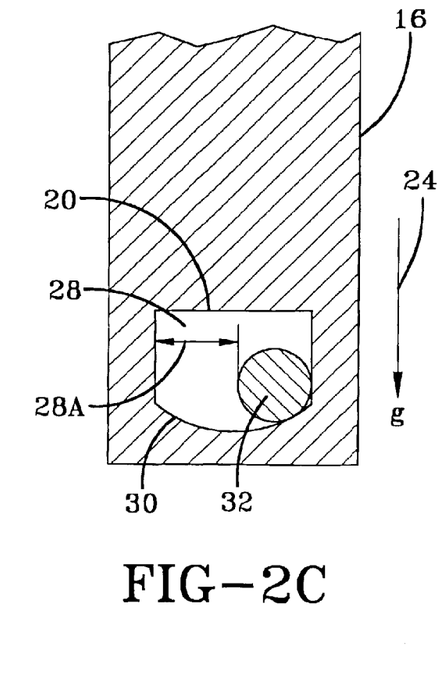

FIG. 2(A) illustrates a prior art impact damper 22 comprised of a rattling mass, such as a ball 22A, and a flat bottomed cavity 22B. FIG. 2(A), as well as FIGS. 2(B) and 2(C), illustrates that blade 16 is oriented such that an acceleration field 24($g$) forces or moves the impact damper downward. The impact damper 22 functions by dissipating energy each time its ball 22A strikes the walls of a cavity 22B located within the blade 16. It has been determined that in a high-g field, misalignment or friction can immobilize the impact damper 22 of FIG. 2(A) rendering it inoperable to dampen vibrations being experienced by blade 16.

FIG. 2(B) illustrates a tuned mass damper 26 comprised of a energy absorbing mass 26A and a frequency governing mechanism 26B in the form of a spring and a damping mechanism 26C in the form of a shock absorber. The tuned mass damper 26 functions by absorbing kinetic energy from the vibrating blade 16 into the tuned mass 26A which, in turn, sheds this kinetic energy through the damping mechanism 26C. In operation, when the tuned mass damper 26 is driven at resonance because of the vibrations to which the blade 16 is subjected, the tuned mass damper 26 produces maximum mass 26A excursions within a cavity 26D, making the tuned mass damper 26 act as an impact damper because the energy absorbing mass 26A impacts the walls of the cavity 26D in the blade 16. Once this resonance condition occurs, the tuned mass damper 26 is no longer optimized with respect to its design parameters thereby significantly reducing its efficiency. In addition, this tuned mass damper 26 has only one fixed resonant frequency that cannot change with the rotor speed and the anticipated frequency of aerodynamic excitation of vibration.

FIG. 2(C) illustrates the self-tuning impact damper 20 of the present invention. The self-tuning impact damper 20 does not have the drawbacks of the prior art damping mechanisms of FIGS. 2(A) and 2(B). The self-tuning impact damper 20 has a cavity 28 with a trough configuration (as shown in FIG. 1) having a spherical bottom 30. The cavity 28 also has a gap 28A. The walls of the cavity 26 confine a rattling mass 32 which may be a ball. As will be further described, the ball 32 and the spherical bottom 30 have parameters that are selected in accordance with the anticipated frequency of aerodynamic excitation of the blade 16 and the speed of rotation of the rotor 14. The self-tuning impact damper 20 for several embodiments has dimensions which are given in Table 1 related to engine order and crossing speed and that may be further described with reference to FIG. 3.

TABLE 1

| Hub-Damper Distance | Engine Order | Ball (32) Radius | Trough (30) Radius | Impactor Cavity (28A) Gap | Crossing Speed | Resonance Frequency |
| --- | --- | --- | --- | --- | --- | --- |
| 10.203 in | 3 | 0.0625 in | 1.031 in | 0.125 in | 900 rpm | 45.0 Hz |
| 10.203 in | 4 | 0.0625 in | 0.607 in | 0.125 in | 655 rpm | 42.7 Hz |
| 10.203 in | 5 | 0.0625 | 0.411 in | 0.125 in | 510 rpm | 42.5 Hz |

Figure 3:
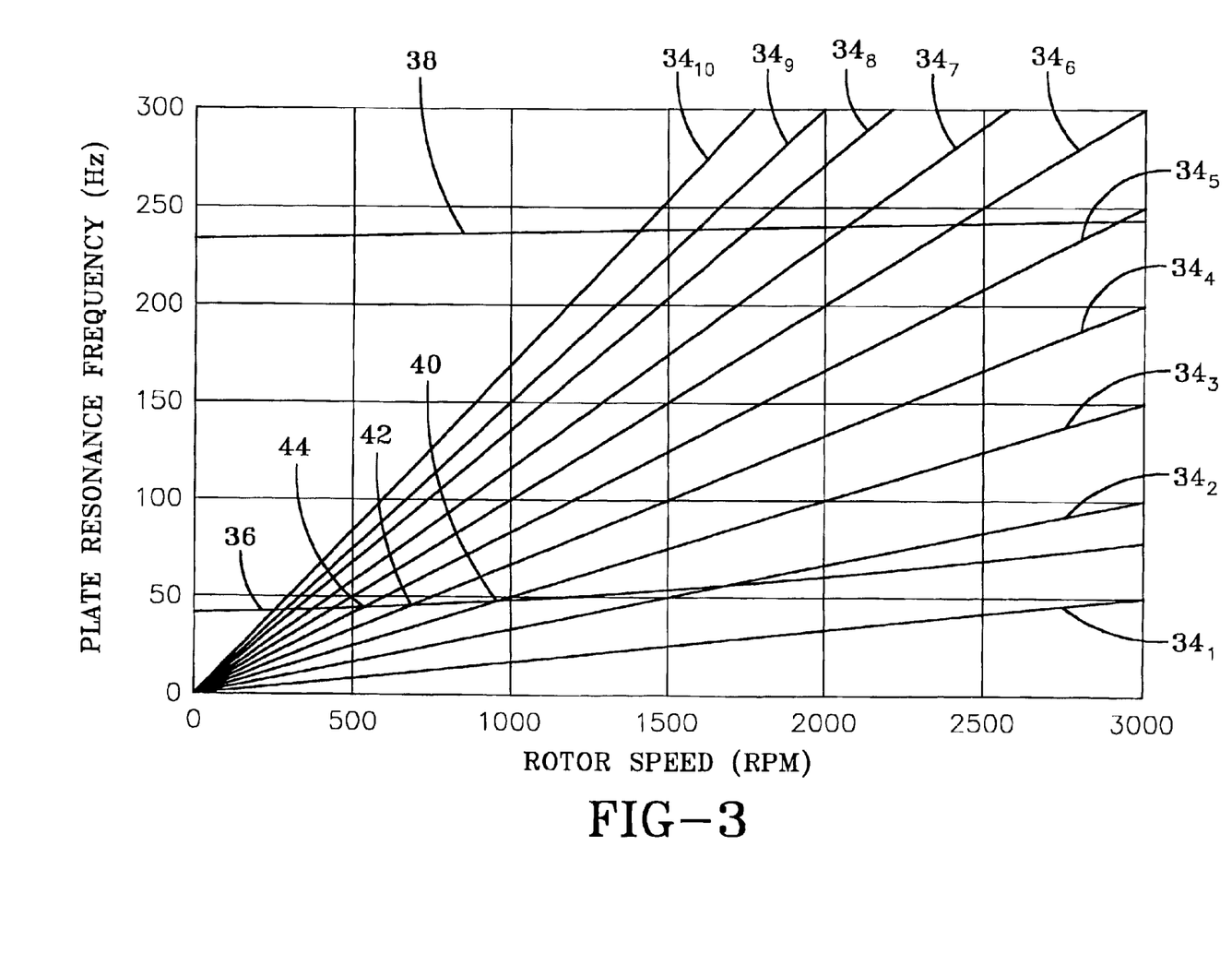
FIG. 3 illustrates a Campbell diagram showing speed lines and resonant frequencies plotted against rotor speed.

FIG. 3 illustrates a Campbell diagram, previously discussed in the "Background" section, showing speed line $34_1$, $34_2$, $34_3$, $34_4$, $34_5$, ... $34_{10}$, wherein the subscript thereof indicates an engine order which represents a frequency that is an integer multiple of the rotor speed. Engine order is the relationship between engine rotor speed (expressed in revolutions per minute, or rpm) and the frequency of aerodynamic excitation of rotating blade 16 vibration (expressed in cycles per second called Hertz, or Hz). Engines have multiple order line excitations that are based on the pattern of internal stationary vanes called stators.

FIG. 3 further illustrates two plots 36 and 38 which represent two resonant frequencies of the rotating blades 16. Whenever a speed line, e.g., $34_3$ crosses (indicated by location 40) a resonant frequency line, e.g., 36, the frequency of aerodynamic excitation matches the resonant frequency of the rotating blade leading to resonant blade vibration.

With simultaneous reference to FIG. 3 and Table 1, it is seen that crossover points 40, 42, 44, of FIG. 3 are respectively associated with speed lines 343, 344, and 345 (engine orders 3, 4 and 5 respectively) and respectively have crossing speeds 900 rpm, 655 rpm and 510 rpm as tabulated in Table 1.

With further reference to Table 1, the radii of the ball 32 and the spherical trough 30, as well as the acceleration field 24, tune the self-tuner impact damper's resonant frequency to the frequency of excitation encountered on the speed line. The ball's 32 resonant frequency is an integer multiple (engine order) of the speed of the rotor 14. For example, with regard to FIG. 3, if the engine order is 3 then the parameters of the ball 32 and spherical trough 30 are selected so that the ball 32 resonates at three times the rotor speed. When the speed line $34_3$ corresponding to engine order 3 crosses the blade resonance frequency at 900 rpm at crossover point 40, then the ball 32 resonates at 2,700 rpn, or 45 Hz.

The natural frequency of the self-tuning impact damper 20 having the typical parameters given in Table 1, is a linear function o, the rotor speed, and can be selected to follow any desired engine order line. The linear function of rotor speed is more fully discussed in the previously incorporated by reference U.S. Pat. No. 5,924,845. The natural frequency of the self-tuning impact damper follows the selected engine order line, damping blade resonant crossings in multiple modes in a manner as described for FIG. 3. In the practice of the present invention, a self-tuning impact damper 20 was studied analytically for a simple two (2) degree-of-freedom system 46 shown in FIG. 4.

Figure 4:
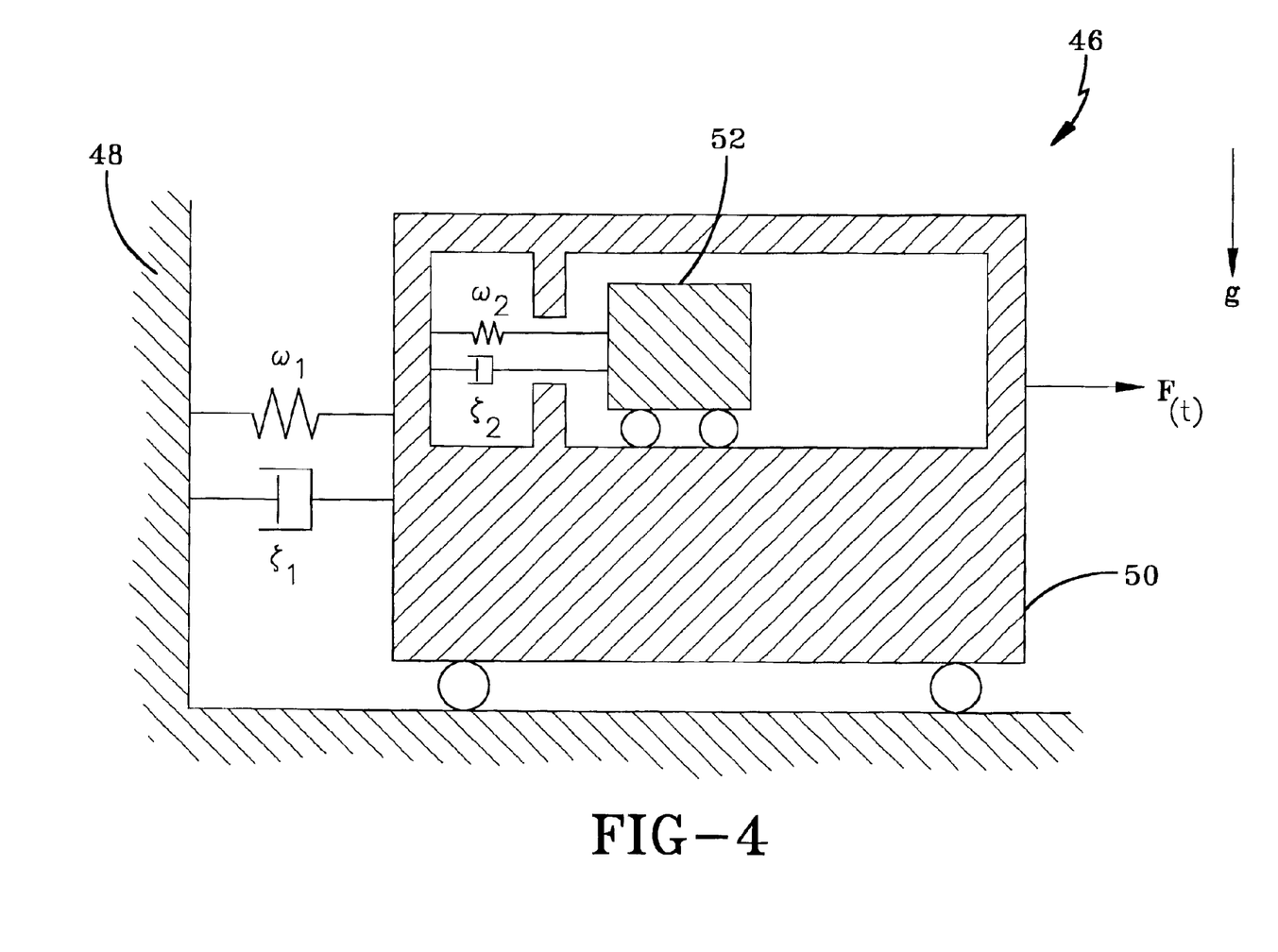
FIG. 4 illustrates a two (2) degree-of-freedom system.

FIG. 4 illustrates the system 46 associated with a stable base 48 that is operatively interrelated to a primary mass 50 and a tuned mass 52. The primary mass 50 has a natural frequency $\omega_1$, and a damping coefficient $\zeta_1$ in the absence of the tuned mass. The tuned mass 52 has a natural frequency $\omega_2$ and a dampening coefficient $\zeta_2$ when the primary mass remains stationary. For the purpose of this invention, the primary mass 50 may be considered to be the blade 16, whereas the tuned mass 52 may be considered to be the self-tuning impact damper 20.

The natural frequency of the tuned mass $\omega_2$ is that of a ball rolling without slip in a spherical trough in the cavity while under a centrifugal acceleration load g (FIG. 4). The acceleration g is provided by the rotation of the blade, and is equal to $R_o \omega_R^2$, where $R_o$ is the distance radially from the axis of rotation to the damper. The parameter $\omega_R$ is the rotational speed in radians per second. The frequency $\omega_2$ is defined such that $$\omega_2 = \omega_R \sqrt{\frac{5R_0}{7(R-r)}}$$

where R is the radius of the spherical trough, and r is the radius of the ball. If the damper is designed such that its frequency $\omega_2$ is an integer multiple N (engine order) of the rotor speed $\omega_R$, then the damper parameters must obey the equation $$N = \sqrt{\frac{5R_0}{7(R-r)}}$$

The equations of motion governing the system of FIG. 4 are $$\begin{pmatrix} \ddot{x}_1 \\ \ddot{x}_2 \end{pmatrix} + \begin{bmatrix} 2\zeta\omega_1 & -2\mu\zeta_2\omega_2 \\ -2\zeta\omega_1 & 2(1+\mu)\zeta_2\omega_2 \end{bmatrix} \begin{pmatrix} \dot{x}_1 \\ \dot{x}_2 \end{pmatrix} +$$

$$\begin{bmatrix} \omega_1^2 & -\mu\omega_2^2 \\ -\omega_1^2 & (1+\mu)\omega_2^2 \end{bmatrix} \begin{pmatrix} x_1 \\ x_2 \end{pmatrix} = \begin{Bmatrix} \frac{F(t)}{m_1} \\ -\frac{F(t)}{m_1} \end{Bmatrix}$$

where $x_1$ is the absolute position of the primary mass, $x_2$ is the position of the tuned mass relative to the primary mass, $\mu$ is the ratio of the primary mass to the tuned mass, $m_1$ is the primary mass, ard F(t) is the force applied to the primary mass. These equations are valid for relatively small $x_1$ displacements.

When the tuned mass strikes the walls of the cavity in the primary mass, the velocities of both masses are assumed to change according to the equation $$\begin{Bmatrix} \dot{x}_1^+ \\ \dot{x}_2^+ \end{Bmatrix} = \begin{bmatrix} 1 & \frac{\mu(1+\varepsilon)}{1+\mu} \\ 0 & -\varepsilon \end{bmatrix} \begin{Bmatrix} \dot{x}_1^- \\ \dot{x}_2^- \end{Bmatrix}$$

where $\varepsilon$ is the coefficient of restitution between the primary mass and the tuned mass, and the superscripts − and + refer to the velocities immediately before and after impact, respectively.

With reference to FIG. 4, the frequency ratio $\Omega$, (the ratio of the tuned mass frequency $\omega_2$ to the main mass natural frequency $\omega_1$) and the tuned mass damping $\zeta_2$ were varied to study the effect of damping coefficient $\zeta$ and the amplification factor Q of the entire damper system 46. In such a pursuit, the main mass damping $\zeta_1$ was set at 0.002 so as to agree with previous experimental data that is more fully discussed fin the technical article of Duffy, K. P., Brown, G. V., and Mehmed, O. 1998 entitled "Impact Damping of Rotating Cantilever Plates", published in the $3^{rd}$ National Turbine Engine High Cycle Fatigue (HCF) Conference of 2–5 February 1998, and herein incorporated by reference. Further, the mass ratio $\mu$ (ratio of tuned mass to primary mass) was set for 0.003

Figure 5:
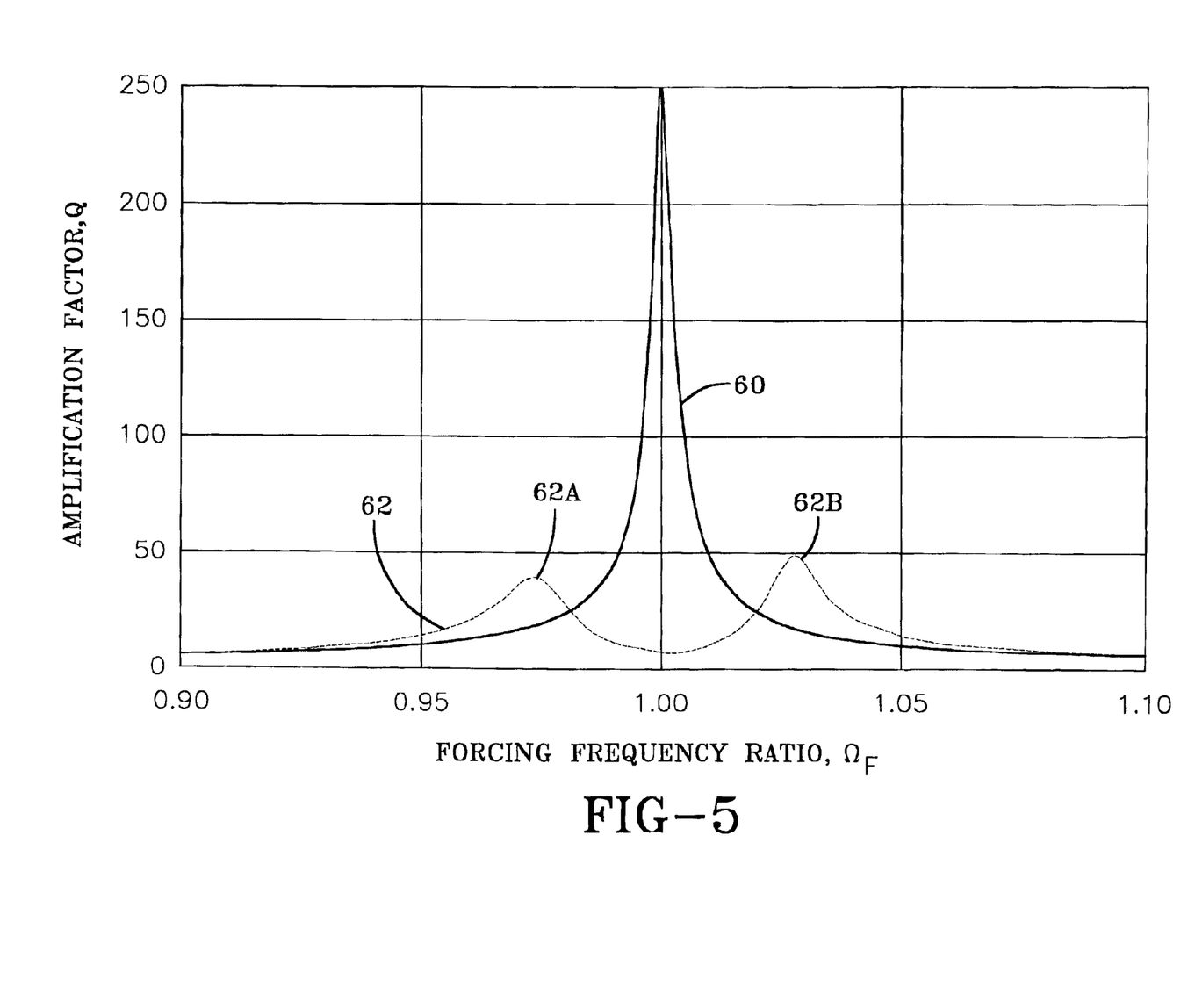
FIG. 5 illustrates various curves associated with tuned mass amplification factor calculations.

For the simple tuned damper 26 of FIG. 2(a) with no impacts, the equations of the motions were solved, in a manner known in the art, in a closed form to obtain a primary mass displacement amplitude as a function of the ratio $\Omega_F$ of excitation frequency to primary mass frequency $\omega_1$. FIG. 5 is a plot of amplification factor Q vs forcing frequency ratio $\Omega_F$ and illustrates two curves 60 and 62, wherein curve 60 has a peak obtained without a tuned damper 26 having an amplification factor Q of 250. The amplification factor is defined as the peak steady state response divided by the static response. For a linear system, Q is merely $1/2\zeta$. The curve 62 is obtained by the use of turned damper 26 and has two peaks, 62(A) and 62(B), wherein peak 62(B) has the highest response peak which was used to calculate the amplification factor Q. Peak 62B represents a tuned mass damping $\zeta_2$=0.01 and an amplification factor Q=50. The amplification factor Q of peak 62B was then converted to a damping coefficient $\zeta$ by assuming that the damping coefficient $\zeta=1/(2\ Q)$, wherein damping coefficient $\zeta$ represents that of the system 46 of FIG. 3. Finally the damping difference $\Delta\zeta$ is found from the damping difference $\Delta\zeta$=damping coefficient $\zeta$—the primary mass damping $\zeta_1$. The damping difference AC is a total amount of the additional damping provided by the self-tuned impact damper 20 of the present invention. For the quantities giver: ($\zeta=1/2Q=1/(2)\ (50)=0.01)-(\zeta_1=0.002)\Delta\zeta=0.006$.

Figure 6A:
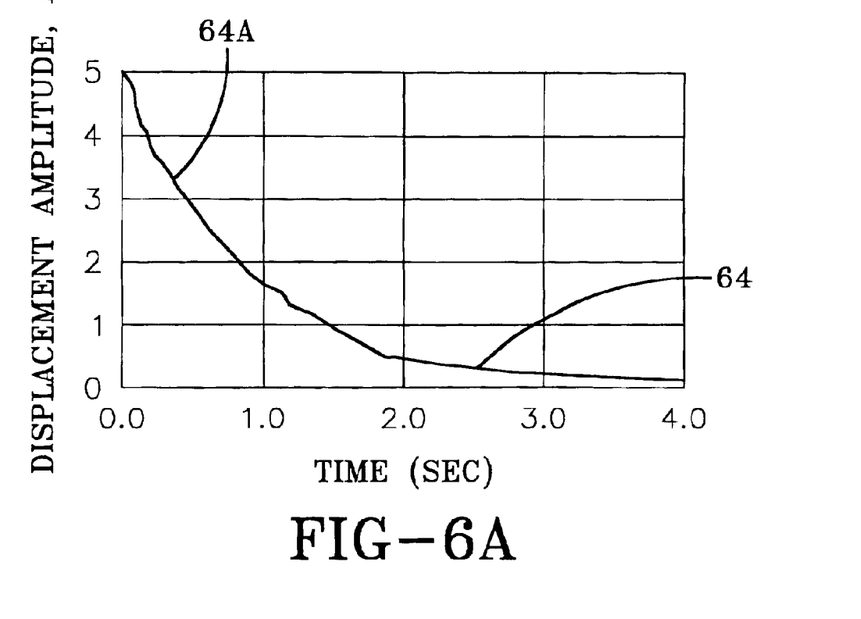
Figure 6B:
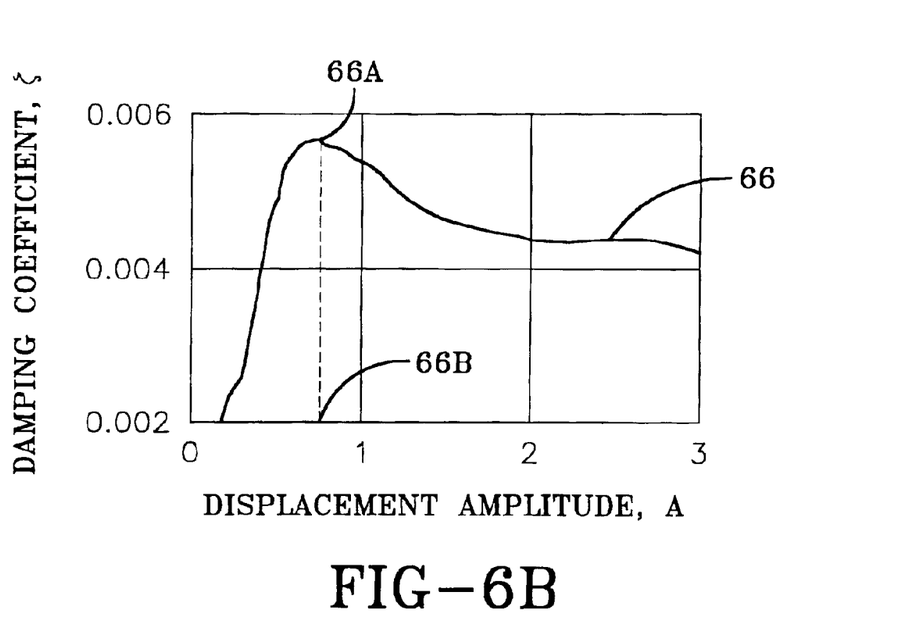

The self-tuned impact damper 20 of FIG. 2(C) was then analyzed using a Fortran computer program to simulate the primary mass 50 of FIG. 4 being released from rest and which may be further described with reference to FIG. 6 composed of FIG. 6(A) showing a curve 64 representative of a plot of Displacement Amplitude A vs time (sec), and FIG. 6(B) showing a curve 66 representative of a plot of Damping Coefficient $\zeta$ vs Displacement Amplitude A. The displacement amplitude A is nondimensional and represents the ratio of primary mass displacement amplitude (such as blade 16) to the gap 28A of self-tuned impact damper 20 of FIG. 2(C). The curve 64 has a portion 64A that represents an exponential decay curve of the simulated delay envelope for a given value of $A=Ce^{-\zeta\omega t}$, where C=initial primary mass displacement. The exponential decay portion 64A was used to develop the curve 66 of FIG. 6(E)

The curve 66 has a portion 66A representative of the damping coefficient $\zeta_{max}$ and a portion 66S, which represents the displacement $A_{max}$ at maximum dampening. In a manner as previously described, the value of the primary mass damping $\zeta_1$ is subtracted from the damping coefficient $\zeta$ curve 66 of FIG. 6(B) to obtain the damping difference $\Delta\zeta$. With regard to the values of $\Delta\zeta$, any value of the damping difference Ad greater than zero indicates that the damping technique of the self-tuning impact damper 20 is functioning.

Figure 7:
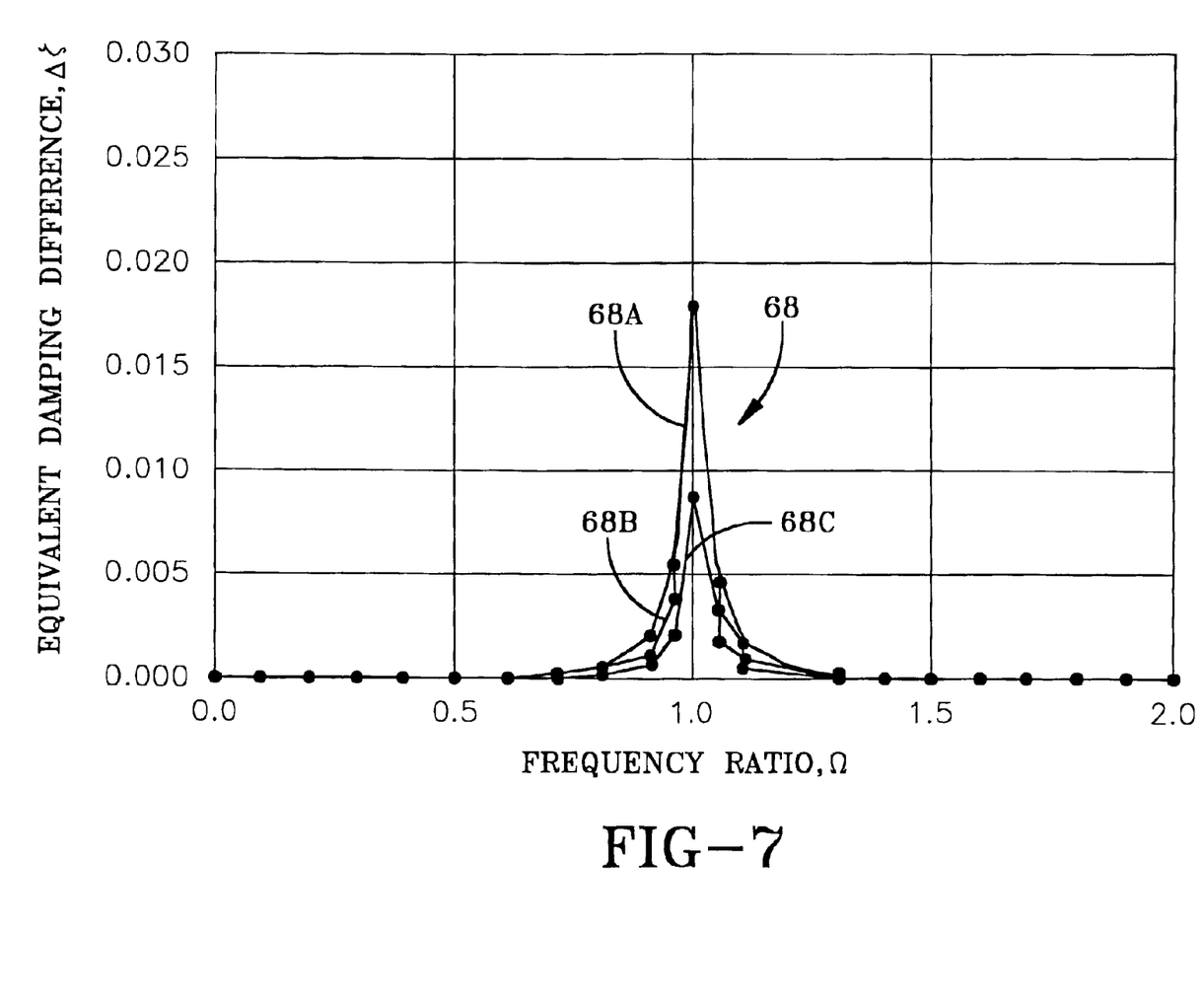
FIG. 7 illustrates response curves associated with the tuned mass damper effectiveness.
Figure 8:
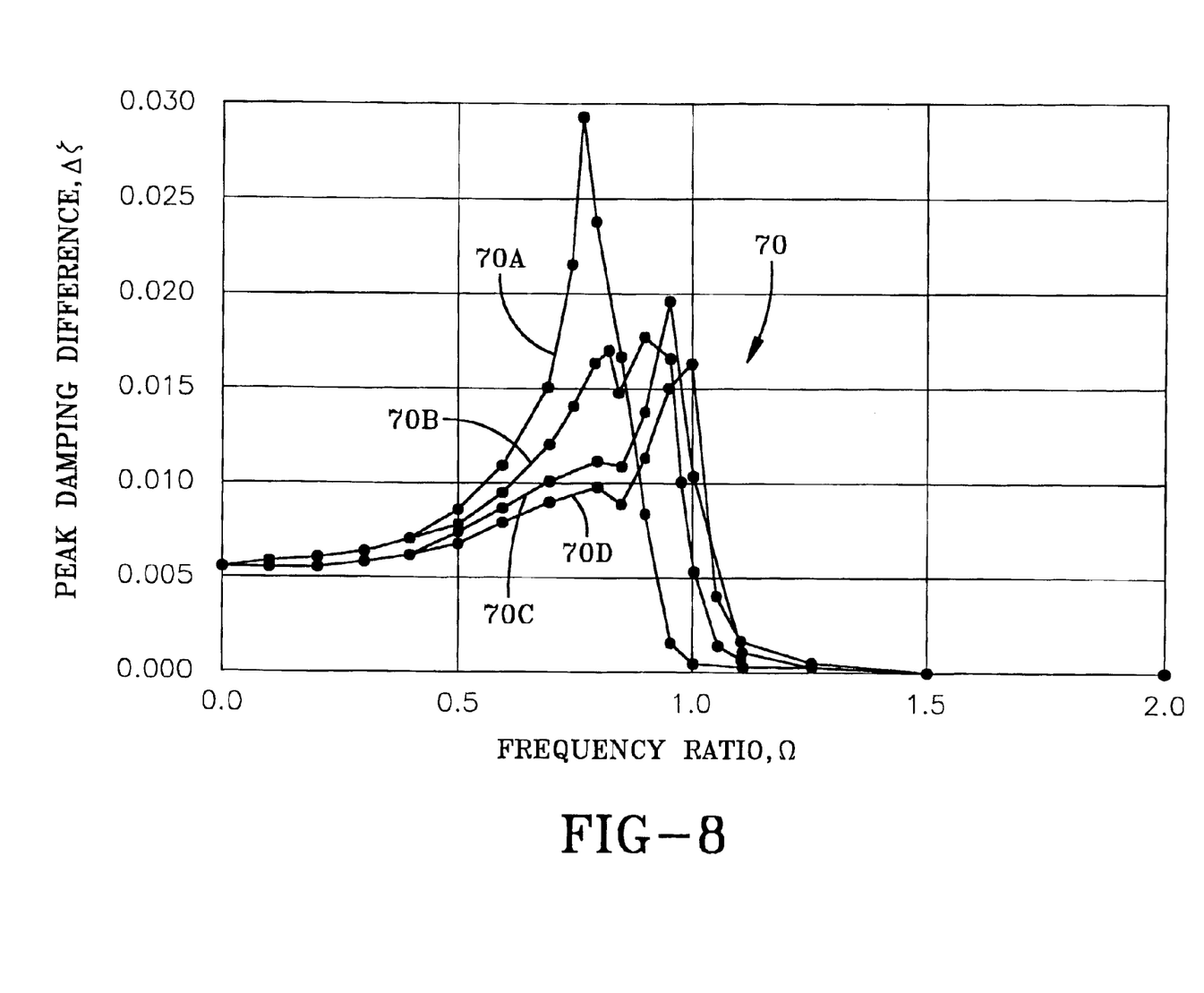
FIG. 8 illustrates response curves associated with the self-tuning impact damper effectiveness of the present invention.

The benefits of the present invention may be further described with reference to FIGS. 7 and 8 that respectively show theoretical results for the damping differences $\Delta\zeta$ for the simple tuned damper (FIG. 2(B)) and or the self-tuning impact damper (FIG. 2(C)). FIGS. 7 and 8, in the manner as discussed with regard to FIG. 4, are the results realized by the utilization of primary mass damping $\zeta_1$=0.002 and a mass ratio $\mu$=0.003. FIGS. 7 and 8 represent plots of equivalent damping differences $\Delta\zeta$ vs frequency ratio Q. More particularly, FIG. 7 illustrates a family 68 of curves 68A, 68B, and 68C What respectively resulted from the utilization of tuned mass damping $\zeta_2$=0.01; 0.02; and 0.03. Similarly, FIG. 8 illustrates a family 70 of curves 70A, 70B, 70C and 70D that respectively resulted from the utilization of tuned mass damping $\zeta_2$=000; 001; 0.02; and 0.03.

From a comparison between FIG. 7 and FIG. 8, it can be seen at above the frequency ratio $\Omega$=1, the tuned impact damper 26 of FIG. 2(C) and the self-tuned impact damper 20 of FIG. 2(C) perform similarly. However, when the tuned mass resonant frequency is less than the primary mass resonant frequency, or $\Omega$<1, there is significantly more damping (FIG. 8) in the self-tuned impact damper 20 of FIG. 2(C) than that (FIG. 7) in the tuned impact damper 26 of FIG. 2(B).

In the further practice of the present invention, three different self-tuning impact dampers 20 were tested and each of the self-tuning impact dampers had one of the geometries of the ball-in-spherical-trough dampers of Table 1 and which may be further described with reference to FIG. 9 composed of FIGS. 9(A) and 9(B).

Figure 9A:
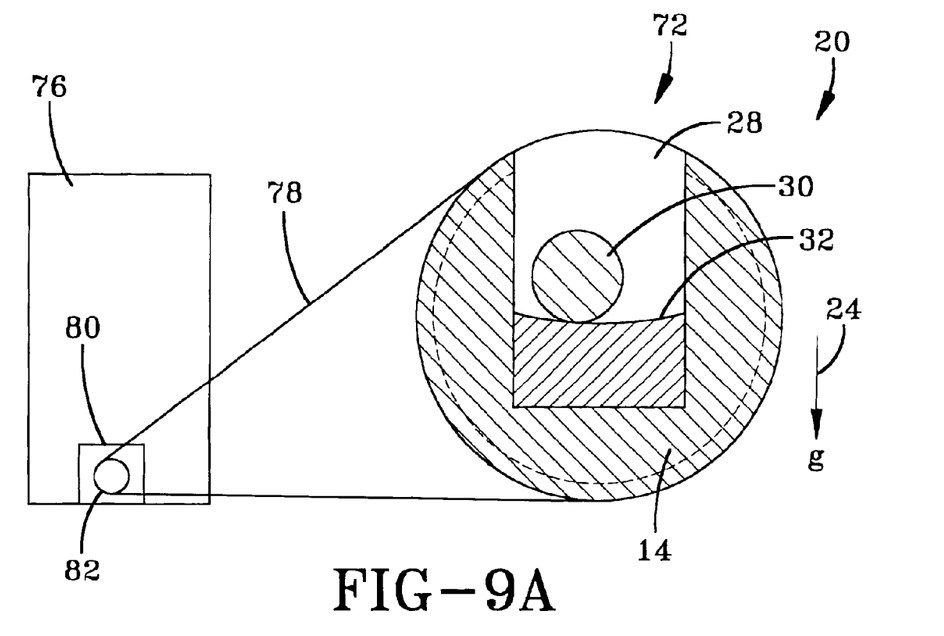
Figure 9B:
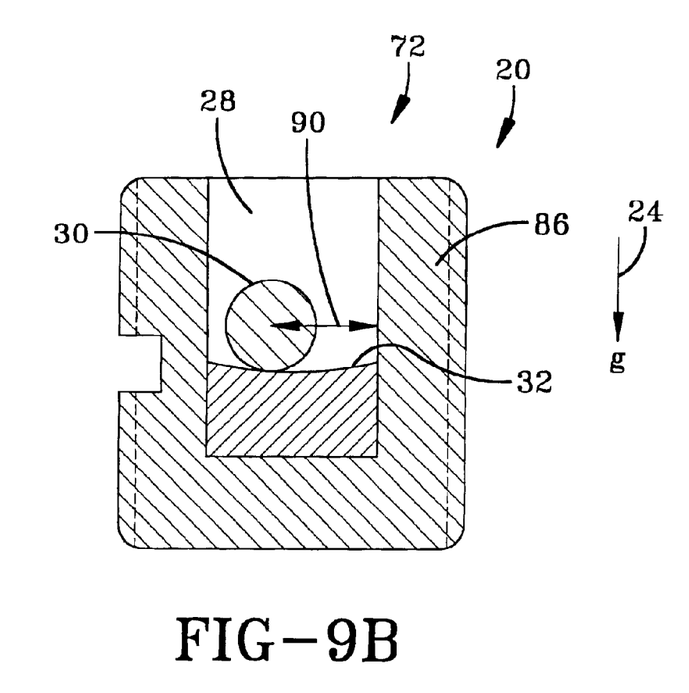

FIGS. 9(A) and 9(B) illustrate a configuration 72 in which the self-tuned impact damper 20 is lodged within a capsule 82 placed in a boss 80 at the tip of a plate 76 that represents a blade 16. This plate 36 is fixed to a hub 12 attached to a rotor 14. The plate tip vibrates such that the damper ball 30 moves in a direction indicated by directional arrows 90.

FIG. 9(A) shows a top view of the plate 76 and the damper 72 illustrating the spherical trough 32 and the direction of centrifugal acceleration (g) 24. The damper capsule 82 screws into the end of the plate 76. FIG. 9(B) shows the same damper 72 in a side view, with the arrows 90 indicating the direction in which the ball rolls and impacts the cavity 28 walls.

The dampers of FIG. 9 were selected to follow the engine order lines of N=3, 4 and 5 shown in FIG. 3 and correlated to the geometry of Table 1. The plates 76 shown in FIG. 9(A) may be further described with reference to FIG. 10.

Figure 10A:
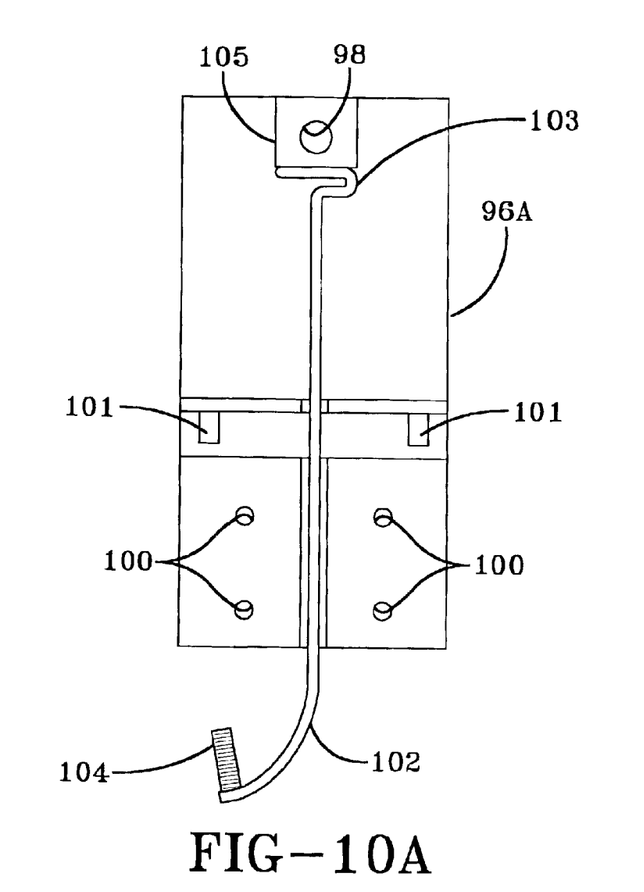
FIG. 10 illustrates the test plates used during the performance of testing related to the present invention.
Figure 10B:
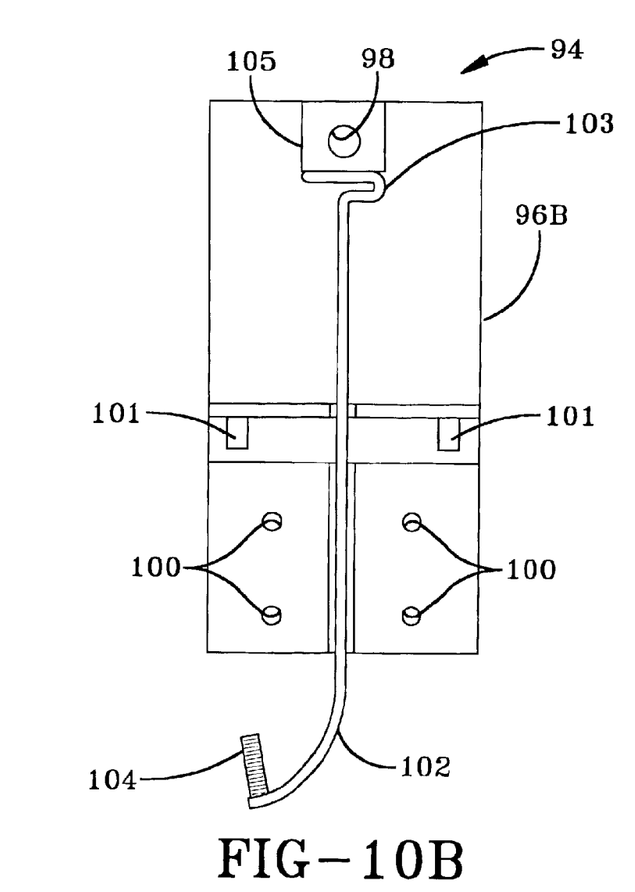

FIG. 10 shows a set 94 of aluminum plates 96A and 96B that are identical to each other. Each of the plates 96A and 96B has a self-impact damper 20 in a capsule (not shown) form placed in location 98. Each of the plates 96A and 96B is attached to the hub 12 by a clamp with bolts at the attachment holes 100. Each of plates 96A ard 96B has a full strain gage bridge formed by two gages 101 on each side of each of the plates 96A and 963, and also has accelerometers 103 placed on each side. The wires from this instrumentation 102 are connected to the rotor wiring through connectors 104.

Each of the plates 96A and 96B had a width of 3 inches, and a thickness of 0.063 inches, and a length of 6 arches. There was a 0.75 inch wide by 0.75 inch long by 0.50 inch thick boss 105 at the end of each plate that was threaded to hold the tuned impact damper capsule at location 98. The plates were rigidly clamped at their bases by means of bolt holes 100 to the rotor of test facility, i.e., the Dynamic Spin Facility at the John Glenn Research Center of NASA. The test facility provided simulation for the testing performed in the practice of this invention, but is not considered part of the present invention The rotor of the test facility was placed in a vacuum tank, and spun at speeds of up to 3000 rpm representative of up to 3,100 g's. At a given rpm, a magnetic bearing provided a sinusoidal excitation to the shaft at the plate first bending frequency. The excitation was suddenly removed and the plate vibration was allowed to decay. This free decay was repeated up to five runs at each rpm and the results of such testing may be further described with reference to FIG. 11.

Figure 11:
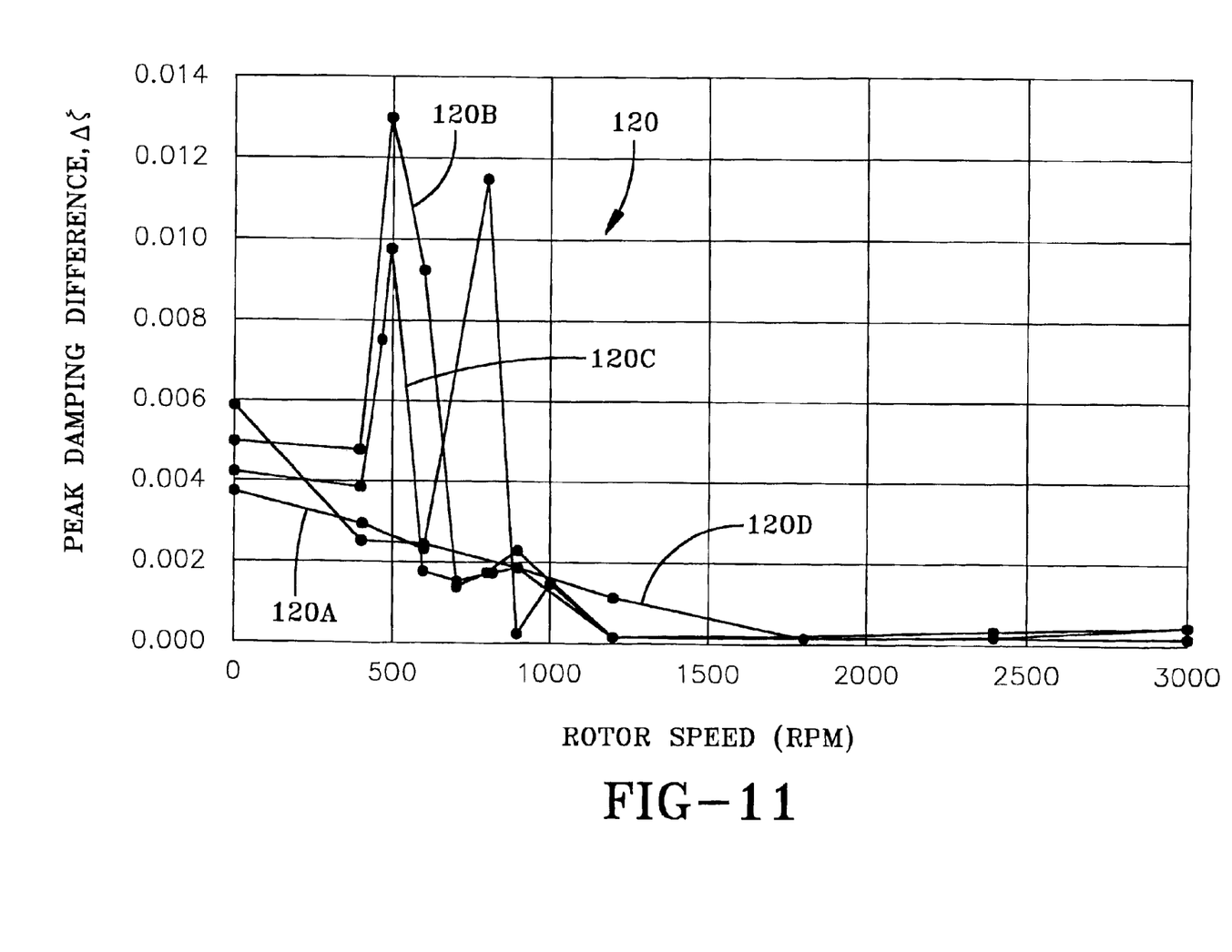
FIG. 11 illustrates the experimental results obtained from the self-tuning impact damper mechanism of the present invention.

FIG. 11 illustrates a family 120 of damping curves 120A, 120B, and 120C that respectively represent engine order lines of N to 3, 4, and 5 having crossing speeds of 900 rpm, 655 rpm, and 510 rpm respectively. The curves 120A, 120B and 120C were derived in a manner as described with reference to FIG. 6 and each of the curves 120A, 120S, and 120C represents a fine achievable value of the dampening difference $\Delta\zeta_{max}$ for each self-tuning impact damper configuration of Table 1.

Figure 12:
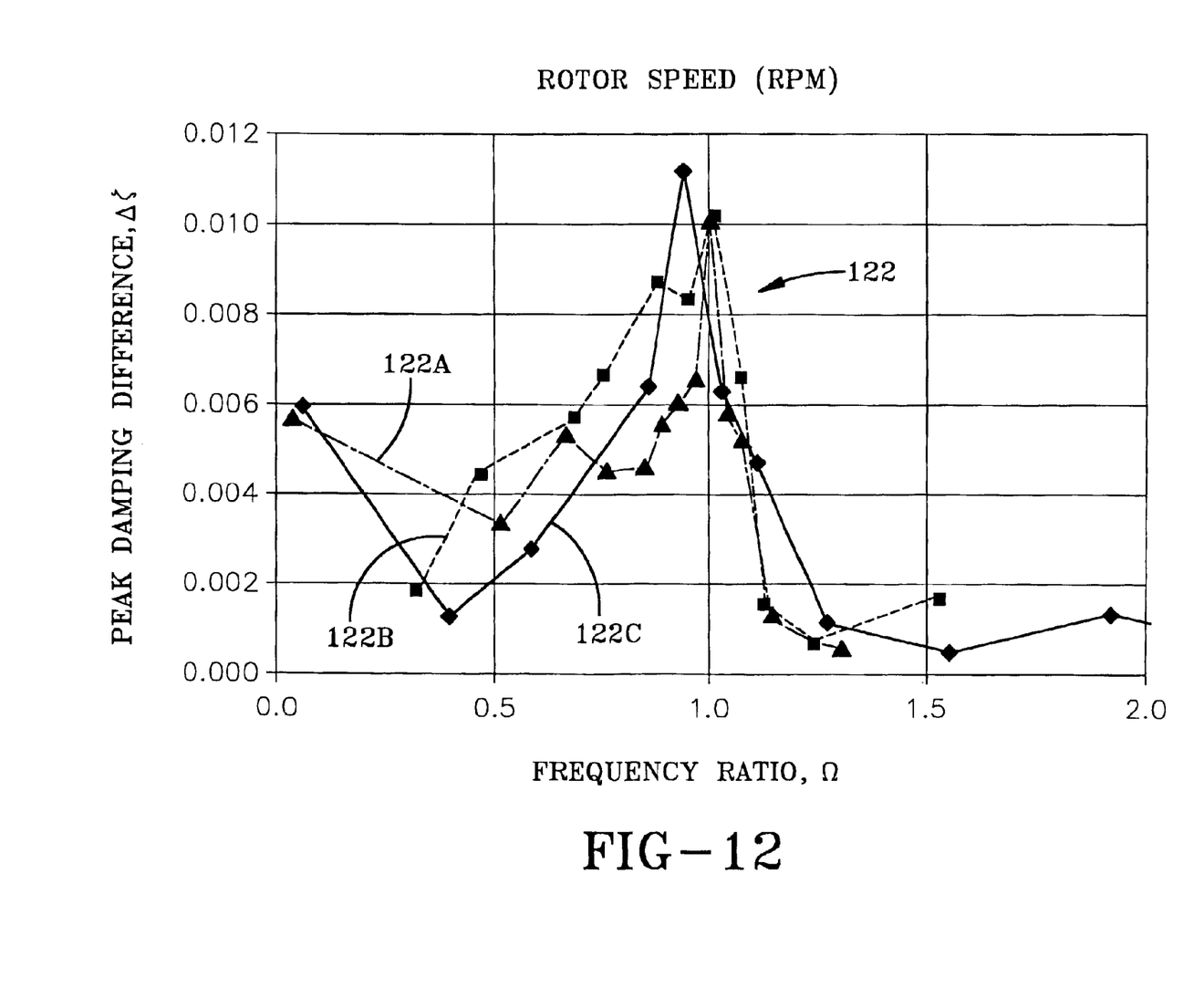
FIG. 12 illustrates further experimental results obtained from the self-tuning impact damper mechanism of the present invention.

FIG. 11 shows an optimum peak dampening difference $\Delta\zeta_{max}$ as a function of rotor speed for each of the three self-tuning impact dampers of Table 1. The curves 120A, 120B, and 120C closely resemble the theoretical curves of FIG. 8 previously described. FIG. 12 shows the data of FIG. 11 plotted as curves 122 of peak damping difference as a function of ratio $\Omega$ of tuned mass resonance frequency to primary mass resonance frequency. Again, the curves 122A, 122B, and 122C closely resemble the theoretical curves of FIG. S.

Accordingly, as predicted by the theoretical simulations, the self-tuned impact damper of the present invention worked best at or below the blade resonant frequency. For example, with reference to FIG. 11, it can be seen that for rotor speeds lower than the crossing frequency the, damper is still functioning. FIG. 11 also shows results 120D from some plates having a simple non-tuned impact damper of FIG. 2(a) previously referred to, in the technical article of Duffy et al. More particularly, with reference to FIG. 11, it is seen that the self-tuning impact damper provides significantly more damping than the simple impact damper. The self-tuning impact damper also functions at higher rotor speeds, and thus higher acceleration levels g, than the simple impact damper. A further review of FIG. 11 reveals that the self-tuning impact dampers of the present invention have significantly higher values of the damping difference $\Delta\zeta$ near their crossing speeds than those of a simple non-tuned impact dampers of FIG. 2(B).

It should now be appreciated that the self-tuned impact dampers 20 of the present invention merely desire that the tuned mass frequency $107_2$ be less than that of the blade 16 resonant frequency $\omega_1$. This is a major improvement over the prior art tuned mass damper 26 that substantially requires that the tuned mass and blade resonance frequencies be substantially identical.

It should also be further appreciated that for a given blade 16 configuration with known resonant frequencies and expected values of blade displacement during resonance, the self-tuned impact damper 20 of the present invention may be used to absorb and dissipate the associated vibrations thereof and increase the life expectancy of the blade 16. Similarly, the self-tuning impact damper 20 may be used to extend the operational life of the hub 12. In addition, several resonant peaks associated with the blade 16 or hub 12, could be dampened for specific engine order by using a single self-tuning impact damper 20.

It is to be understood that the invention is not limited to the specific embodiments herein illustrated and described, but may be otherwise without departing from the sphere and scope of the invention.

What we claim is:

1. A method for dynamically absorbing resonant vibration of a rotating component of a turbomachine having an axis of rotation and rotating over a range of turbomachine rotation rates, said method comprising the steps of:

a) providing a cavity with walls and having a spherical trough sufficiently shaped to allow radial movement within the rotating component;

b) providing a ball in said cavity so that it rests in said spherical trough and the separation between the resting ball and the walls of said cavity establishes a gap therebetween;

c) preselecting the radius of the ball, the radius of the spherical trough, and the location of the ball within the cavity relative to the axis of rotation such that the natural frequency of the rolling ball when inside the cavity of the rotating component tracks a preselected speed line of said turbomachine; and d) preselecting the gap within the cavity in which the ball rolls such that the ball impacts the cavity walls during resonance vibration of the rotating component.

2. The device for dynamically absorbing resonant vibration of a rotating component of a turbomachine having an axis of rotation and rotating over a range of turbomachine rotation rates, said device comprising:

a) a cavity with walls and having a spherical trough with a predetermined radius wherein said spherical trough is sufficiently shaped to allow radial movement;

b) a ball having a predetermined radius and placed within said cavity so that it rests in said spherical trough at a predetermined location within said cavity relative to said axis of rotation and the separation between the resting ball and the walls of said cavity establishes a predetermined gap therebetween;

c) wherein said predetermined radii of said ball and said predetermined location of the ball relative to the axis of rotation are selectable such that the natural frequency of the rolling ball, when inside the cavity of the rotating component, tracks a preselected speed line of the turbomachine, and d) wherein said predetermined gap within the cavity in which the bail rolls is selectable such that the ball impacts the cavity walls during resonant vibration of the rotating component.

* * * * *